United States Patent [19]

Nakagawa et al.

[11] 4,035,117
[45] July 12, 1977

[54] CHARGING MEANS FOR A VULCANIZING PRESS

[75] Inventors: Kazuhiko Nakagawa; Yasuhiko Fujieda, both of Kobe, Japan

[73] Assignee: Kobe Steel Ltd., Kobe, Japan

[21] Appl. No.: 689,061

[22] Filed: May 24, 1976

[30] Foreign Application Priority Data

May 22, 1975 Japan .................. 50-62220

[51] Int. Cl.² .......................................... B29H 5/04
[52] U.S. Cl. ................................. 425/19; 425/33; 425/36; 425/38
[58] Field of Search ............... 425/20, 23, 25, 19, 425/32, 33, 35, 36, 43, 48, 52, 58

[56] References Cited

U.S. PATENT DOCUMENTS

| | | | |
|---|---|---|---|
| 2,848,740 | 8/1958 | Frohlich et al. | 425/33 |
| 2,854,693 | 10/1958 | Robbins | 425/33 |
| 2,874,405 | 2/1959 | Stanford | 425/43 X |
| 2,880,458 | 4/1959 | Frohlich et al. | 425/32 X |
| 2,997,738 | 8/1961 | Soderquist | 425/38 |
| 3,071,811 | 1/1963 | Herbert | 425/33 |
| 3,167,810 | 2/1965 | Soderquist | 425/32 |
| 3,380,115 | 4/1968 | Soderquist | 425/38 |
| 3,465,385 | 9/1969 | Zangl | 425/36 |
| 3,550,196 | 12/1970 | Gazuit | 425/38 X |
| 3,564,649 | 2/1971 | Soderquist | 425/36 X |
| 3,640,653 | 2/1972 | Laenen et al. | 425/38 X |
| 3,712,769 | 1/1973 | Cimprich | 425/38 X |
| 3,794,457 | 2/1974 | Gazuit | 425/23 X |
| 3,837,770 | 9/1974 | Gazuit | 425/33 |
| 3,890,073 | 6/1975 | Getz | 425/33 X |
| 3,976,409 | 8/1976 | Athey | 425/33 X |

*Primary Examiner*—J. Howard Flint, Jr.
*Attorney, Agent, or Firm*—Oblon, Fisher, Spivak, McClelland & Maier

[57] ABSTRACT

A charging device for a vulcanizing press has a cylinder disposed concentrically with a vulcanizing mold, a movable piston vertically movable through the cylinder, a piston rod secured to the piston, and a gas-tight cylindrical bladder of a flexible material held between the upper end of the piston rod and the top of the cylinder. The charging further includes hollow cylindrical body disposed above and vertically movable with respect to the mold and having an inner diameter greater than the outer diameter of the bladder, the hollow cylindrical body being provided with a fluid inlet port for maintaining the pressure within the space defined between the inner surface of the hollow cylindrical body and the outer surface of the bladder to be higher than the pressure within the bladder, and also provided on the lower end of the outer periphery thereof with a tire retaining device capable of expansion and contraction in the radial direction for holding the upper bead of a tire to be loaded in the mold for vulcanization.

8 Claims, 9 Drawing Figures

CHARGING MEANS FOR A VULCANIZING PRESS

BACKGROUND OF THE INVENTION

1. Field of the Invention

The present invention relates generally to tire vulcanizing apparatus, and more particularly to a charging device for such apparatus.

2. Description of the Prior Art

The prior art vulcanizers for tire recapping are roughly classified into two types, namely one using an air bag and one using a bladder. In the air bag type, a doughnut-like air bag made of rubber and having a comparatively large wall thickness is charged into a tire to be vulcanized by using a separate charging and discharging means, then the tire with the bag in it is loaded in the vulcanizer for vulcanization with a vulcanizing medium such as steam or hot water under high pressure charged into it, and after completion of the vulcanization, the bag is removed from the vulcanized tire by using the aforementioned means again. This system requires an air bag charging and discharging unit separately of the vulcanizer, thus dictating an increase in the system's cost. In addition, the charging and discharging operations involved are rather complicated and disadvantageous from the standpoints of saving man-hours and automation.

The bladder type is an alternative one, in which a rubber bladder of a cylindrical form having a comparatively small wall thickness is provided as part of the vulcanizer. The bladder is applied over the inner surface of a tire within the vulcanizer for vulcanization with a vulcanizing medium supplied into it from its inner side, and after vulcanization it is removed out of the tire. This type of system is technologically advanced over the air bag type with respect to the saving of man-hours and facilitating the operation, and this technique is already in extensive use as a vulcanizer for new tires. However, vulcanizers for recapped tires do not usually adopt this bladder system. This is partly because of the facts that in case of a recapped tire, the percentage of use is small and also the vulcanizing plant is small in scale and less efficient in the saving of man-hours. Another ground is that in this case special technical difficulties are posed.

More particularly, in the case of recapped tires, adoption of the bladder system presents difficulties in that the distance between the upper and lower beads of a tire to be vulcanized is narrow compared to the non-vulcanized radial tire so that with the conventional vulcanizer for new tires the bladder is not smoothly applied to the inner tire surface. Accordingly, even in the presently used bladder type vulcanizer the cylindrical bladder is charged from the upper side. In this system, the state of the bladder disposed within the vulcanizer and not charged in the tire is inverted 180° with respect to the state of the same bladder charged in the tire. This means that the bladder is subject to compulsive forces at the time of its charging in the tire, thus leading to short service life. Also, since the vulcanizing medium is supplied from the upper side, difficulties are involved when discharging the drainage from the bladder.

SUMMARY OF THE INVENTION

This invention seeks to solve the above problems, and its object is to permit the smooth loading of a tire to be vulcanized in a vulcanizing mold of a vulcanizer for short interbead distance tires and also for smoothly charging the bladder into the tire to be vulcanized.

Another object of the invention is to permit a bladder system for new tires to be suitably adopted for vulcanization of recapped tires, thereby promoting the automation of, and the saving of man-hours in the vulcanizing operation.

A further object of the invention is to extremely improve the durability of the bladder.

The invention, accordingly, features a charging means for a vulcanizing press having a cylinder disposed concentric with a vulcanizing mold, a movable piston vertically movable in the cylinder, a piston rod secured to the piston, and a gas-tight cylindrical bladder of a flexible material held between the upper end of the piston rod and the top of the cylinder. The charging means further includes a hollow cylindrical body disposed above and vertically movable with respect to the mold and having an inner diameter greater than the outer diameter of the bladder, the hollow cylindrical body being provided with a fluid inlet for maintaining the pressure within the space defined between the inner surface of the hollow cylindrical body and the outer surface of the bladder to be higher than the pressure within the bladder, and also provided on the lower end of the outer periphery thereof with a tire retaining means capable of expansion and contraction in the radial direction for holding the upper bead of a tire to be loaded in the mold for vulcanization.

The hollow cylindrical body is also provided with a fluid supply port secured to its flat upper surface. In addition, its outer periphery may be provided with additional fluid supply ports for issuing fluid toward the center thereof or in the tangentional direction with respect to its inner periphery.

The tire retaining means provided on the lower end of the outer periphery of the hollow cylindrical body comprises a disc member provided on the outer periphery of the hollow cylindrical body, a drive means surrounding the disc member and including cylinders capable of movement along the outer periphery of the hollow cylindrical body, paddle members capable of holding a tire and providing a gap for communication between the interior of the tire and atmosphere, and a link mechanism for transmitting the driving force from the drive means for converting the axial movement of the cylinders into a movement of the paddle members in the radical direction.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE ILLUSTRATED EMBODIMENTS

Figure 1:
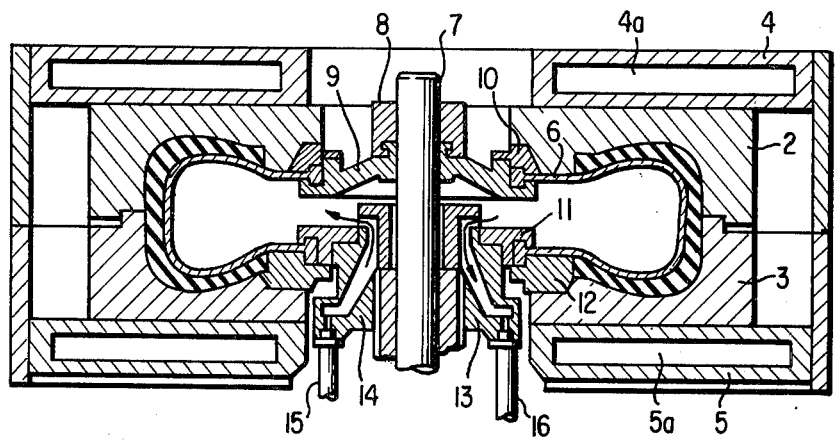
FIG. 1 is a fragmentary axial sectional view showing the bladder charging means according to the invention in a vulcanizing state.
Figure 2:
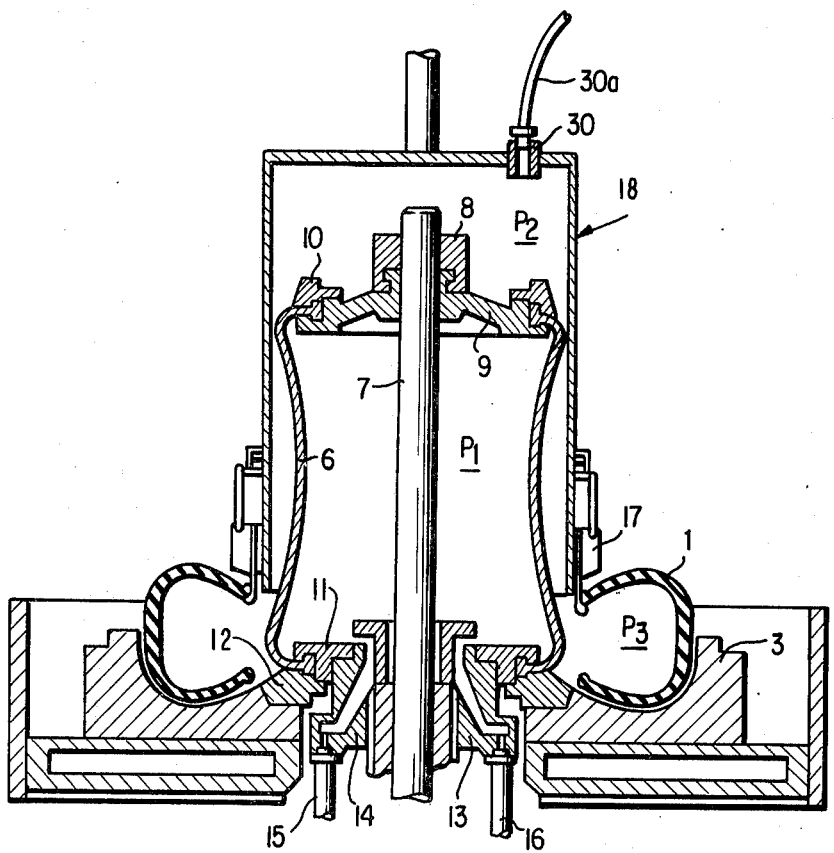
FIG. 2 is a sectional view of the apparatus of FIG. 1 in a state where a tire is held and loaded by a hollow cylindrical body.
Figure 3:
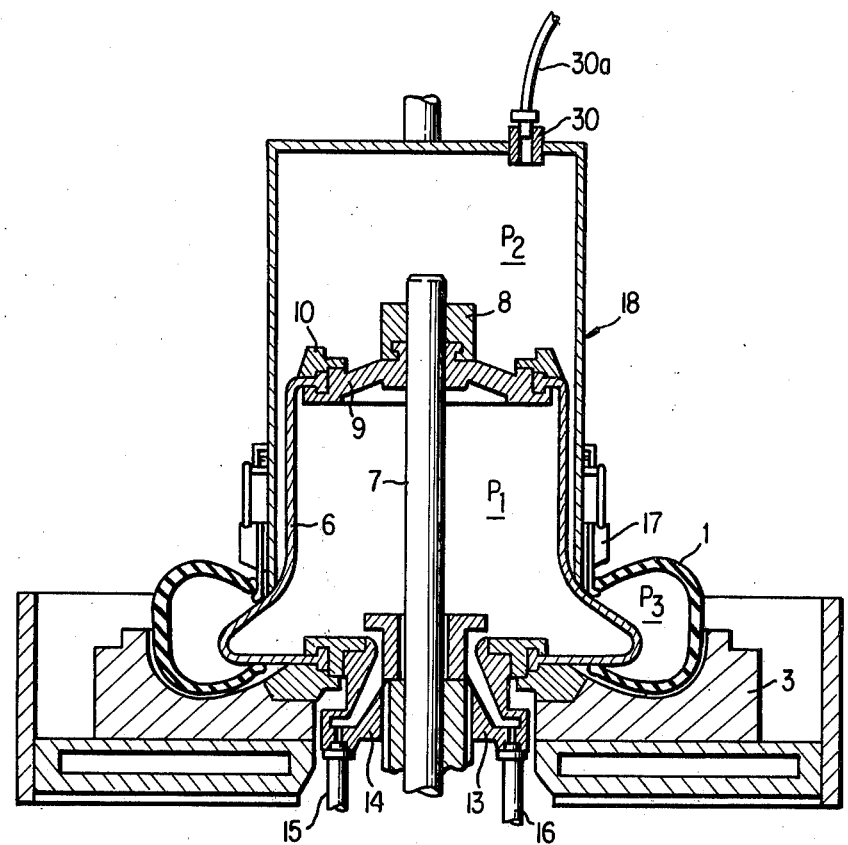
FIG. 3 is a sectional view of the apparatus of FIG. 2 in a state where the bladder is charged into the tire.

The charging means constructed according to the present invention will now be described in conjunction with an illustrated embodiment thereof. FIGS. 1, 2 and 3 show the charging means according to the invention in a vulcanizing state, a tire loading state, and a bladder charging state, respectively. In the FIGS. designated at 1 is a tire to be vulcanized, at 2 and 3 are upper and lower vulcanizing mold halves for forming a pattern on the outside of the tire, and at 4 and 5 are upper and lower platens to which the mold halves 2 and 3 are respectively secured by fastening means such as bolts (not shown). As is shown, the upper and lower patents 4 and 5 have respective cavities 4a and 5a, into which steam can be supplied from the outside for heating the tire 1 from the outside via the mold. Designated at 6 is a gas-tight cylindrical bladder of a flexible material such as rubber. The upper end of the bladder 6 is clamped between an upper clamp ring 9 and an upper bead ring 10 secured thereto, the clamp ring 9 being secured by a rock nut 8 to the top of a piston rod 7 concentrically penetrating the mold and capable of vertical movement therethrough. The lower end of the bladder 6 is clamped between a lower clamp ring 11 and a lower bead ring 12 secured thereto, the clamp ring 11 being secured to an upper hub 14 of a cylinder 13 for driving the piston rod 7. The hub 14 is provided with inlet and outlet passages 15 and 16 for supplying a high pressure heating medium, that is, a vulcanizing medium such as hot water or steam into the bladder. The passages 15 and 16, as shown in the Figures, penetrate the hub 14 and communicate with the interior of the bladder 6. When the tire 1 is vulcanized, a vulcanizing medium is circulated through the passages 15 and 16 for vulcanization, while forming a pattern on the outside of the tire 1 with the mold halves 2 and 3 by utilizing the pressure of the medium. The upper and lower mold halves 2 and 3 should thus be pressed together with a force surpassing the high pressure of the vulcanizing medium.

FIG. 2 shows a hollow cylindrical body 18 constructed according to the invention, and in the illustrated state, the upper bead of the tire 1 is held by a means of a paddle 17 provided on the outer periphery of the lower end of the cylindrical body 18 and the tire 1 is loaded in the lower mold half 3. At this time, the piston rod 7 is raised as is shown thus holding the bladder 6 in its stretched state. At this time, it is suitable to evacuate the interior of the bladder 6 through the passages 15 and 16 in order to facilitate the loading of the tire 1 to be vulcanized in the mold half 2. While the tire 1 is shown to be held by means of the paddle 17, which can be expanded and contracted in the radial direction as will be described hereinafter, it is gripped at its upper bead portion by the paddle 17 when it is in a predetermined position outside the vulcanizer and is then transferred to the position as shown in FIG. 2. At this time, it is to be understood that the upper mold half 2 is retracted so that it will not interfere with the loading of the tire 1.

It will be noted from FIG. 2 that in order to charge the bladder 6 from this state into the tire 1 until it fits itself on the inner surfaces of the tire, fluid under low pressure is introduced into the bladder 6, while fluid of a slightly higher pressure is introduced into the hollow cylindrical body 18 and the piston rod 7 is lowered at a very low speed, whereby a state as shown in FIG. 3 results. More particularly, denoting the gauge pressure within the bladder 6 by $P_1$, the gauge pressure within the hollow cylindrical body 18 by $P_2$, and the gauge pressure in the space enclosed within the tire by $P_3$, by supplying low pressure air or other vulcanizing medium at $P_1 = 0.5$ kg/cm$^2$G through the passages 15 and 16 to the bladder 6 while supplying low pressure air or steam at $P_2 = 1.0$kg/cm$^2$G through a supply duct 30a and inlet port 30 into the hollow cylindrical body 18, the upper portion of the bladder 6 is biased radially inwardly by means of the pressure difference of $P_2 - P_1 = 0.5$ kg/cm$^2$ however the portion of the bladder disposed beneath the lower end of the hollow cylindrical body 18 is not subjected to the high inner pressure within the hollow cylindrical body 18 and is subjected to the atmospheric pressure $P_3$, so that it undergoes a radially outward expansion due to the pressure difference $P_1 - P_3 = 0.5$ kg/cm$^2$ and consequently enters into the tire 1. Furthermore, the fluid within the hollow cylindrical body leaks 18 to the atmosphere at the lower end of the hollow cylindrical body 18, at which $P_2 > P_3$. Thus, there is always a flow of fluid through the space between the inner side of the hollow cylindrical body 18 and bladder 6 due to the aforenoted pressure difference, that is, there is formed a downwardly moving fluid film having a pneumatic lubricating effect so as to provide for the smooth movement of the bladder 6. Furthermore, the paddle 17 holding the upper bead of the tire 1 acts as a guide and is provided over its entire periphery with a plurality of gaps 31 for causing leakage of air within the tire into the atmosphere so as to permit the bladder 6 to into the tire. Thus, as the piston rod is lowered at a very low rate of speed, the bladder 6 is very smoothly inserted into the interior of the tire 1 and permitted to fit well along the inner surface of the tire. Of course, the lower end of the hollow cylindrical body 18 and the end of the paddle 17 preferably have suitably curved surfaces as shown in FIG. 3. Furthermore, while in the instant embodiment $P_1 = 0.5$ kg/cm$^2$ and $P_2 = 1.0$ kg/cm$^2$, in general it is only necessary to meet the condition $P_2 > P_1 > P_3$.

Figure 4:
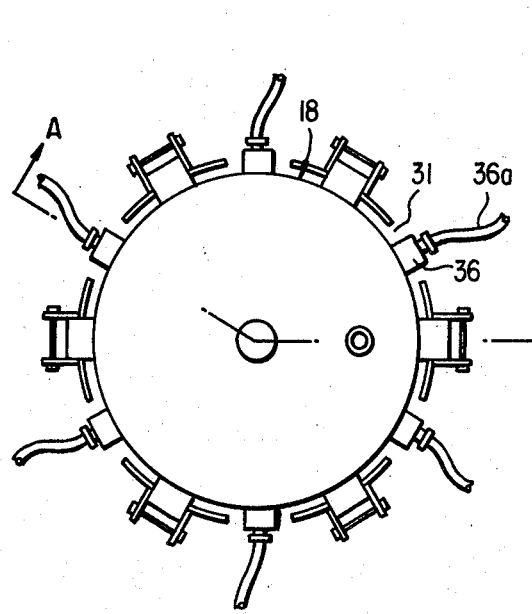
FIG. 4 is a plan view showing an example of the hollow cylindrical body, the peripheral wall of which is provided with a plurality of circumferentially spaced fluid supply ports such that fluid jets therefrom are directed toward its center.
Figure 5:
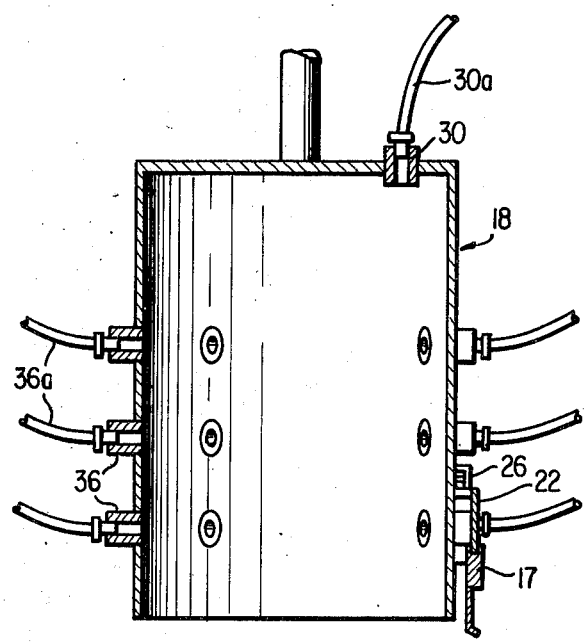
FIG. 5 is a sectional view taken along line A—A in FIG. 4.
Figure 6:
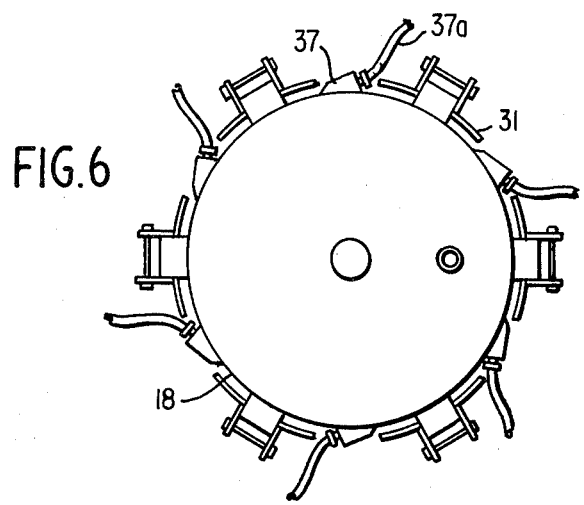
FIG. 6 is a view showing another example of the hollow cylindrical body, the peripheral wall of which is provided with a plurality of circumferentially spaced fluid supply ports such that fluid jets therefrom are directed tangentially with respect to the peripheral wall.

Moreover, in order to reliably prevent the contact of the upper portion of the bladder 6 with the inner surface of the hollow cylindrical body 18, it is desirable to provide the hollow cylindrical body 18, in addition to the supply duct 30a and inlet port 30, with additional supply ducts 36a or 37a and additional supply ports 36 or 37 for supplying fluid, such as air, into the hollow cylindrical body 18 as shown in FIGS. 4, 5 and 6.

In the case of FIGS. 4 and 5, a plurality of supply ports 36 are provided on the periphery of the hollow cylindrical body 18 such that fluid issues from them toward the center of the cylindrical body. This embodiment features the fact that the momentum of the fluid jets is utilized, in addition to the aforementioned pneumatic lubricating effect, for forcibly separating the bladder 6 from the inner surface of the hollow cylindrical body 18. In the instant embodiment, the inlet ports 36 are provided in three, vertically disposed stages, as best seen in FIG. 5 each consisting of six ports, as best seen in FIG. 4, but this number of ports is not limitative. While it is preferable to provide as many inlet ports 36, in effect, a possible for providing as uniform jet impinging upon the periphery of the bladder, the number of jets should be determined from their effect and also from the standpoint of manufacture and operation.

In the case of FIG. 6, a plurality of supply ports 37 are provided on the periphery of the hollow cylindrical body 18 such that fluid issues from them in the tangential direction with respect to the periphery of the cylindrical body. This embodiment features the fact that in order to promote the aforenoted pneumatic lubricating effect, a uniform swirling flow of fluid is provided between the bladder 6 and hollow cylindrical body 18 while also making use of the momentum of the jets similar to the case of FIG. 4.

While in the embodiment of FIGS. 4 and 5 fluid duct 30a and inlet port 30 are provided, they can be omitted in light of the above description.

After the bladder 6 is fitted within the tire 1, the upper mold half 2 is fitted with and pressed together with the lower mold half 3 so as to achieve the state as shown in FIG. 1, and then high pressure heating fluid, such as hot water or steam, is circulated through the passages 15 and 16 in the cylinder 13 to effect vulcanization of the tire 1.

After completion of the vulcanization, the mold is opened, followed by retraction of the upper mold half 2, separation of the hub 14 from the tire 1 with the raising of the hub 14, upward removal of the bladder 6 with the raising of the piston rod 7, holding of the upper bead of the tire by means of the hollow cylindrical body 18, and retraction of the hollow cylindrical body 18, thus completing the removal of the tire.

Figure 7:
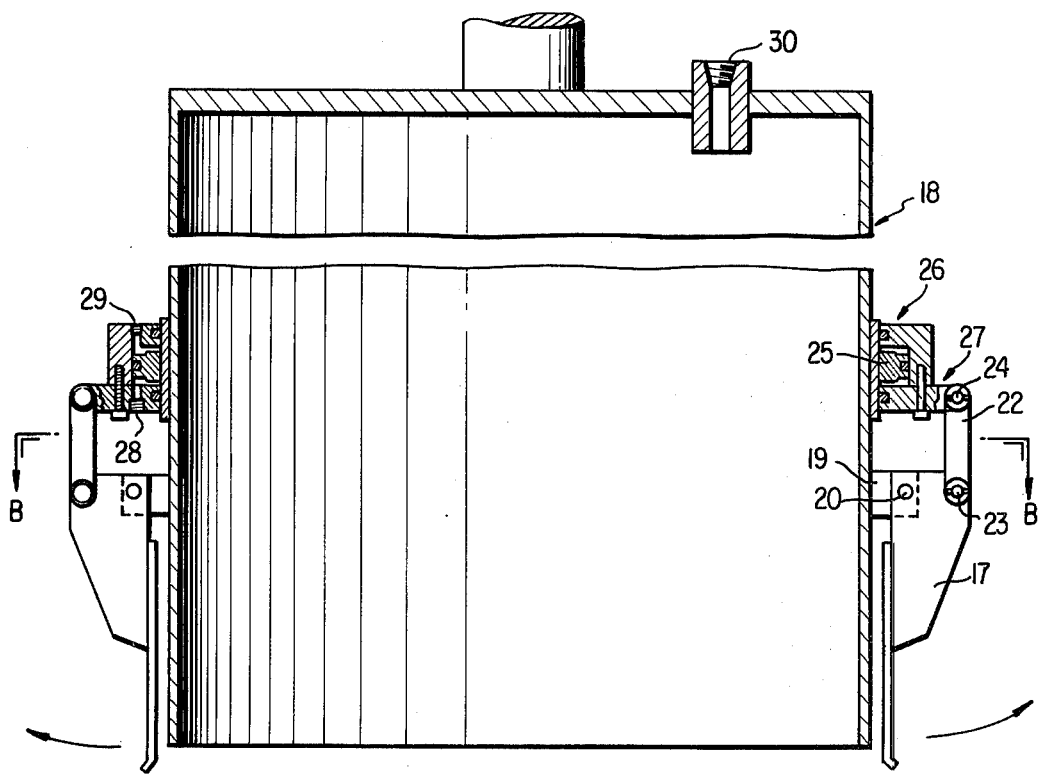
FIGS. 7 and 8 show the hollow cylindrical body of FIG. 3 in detail, with FIG. 7 being a sectional view of the same, and FIG. 8 being a section taken along line B—B in FIG. 7.
Figure 8:
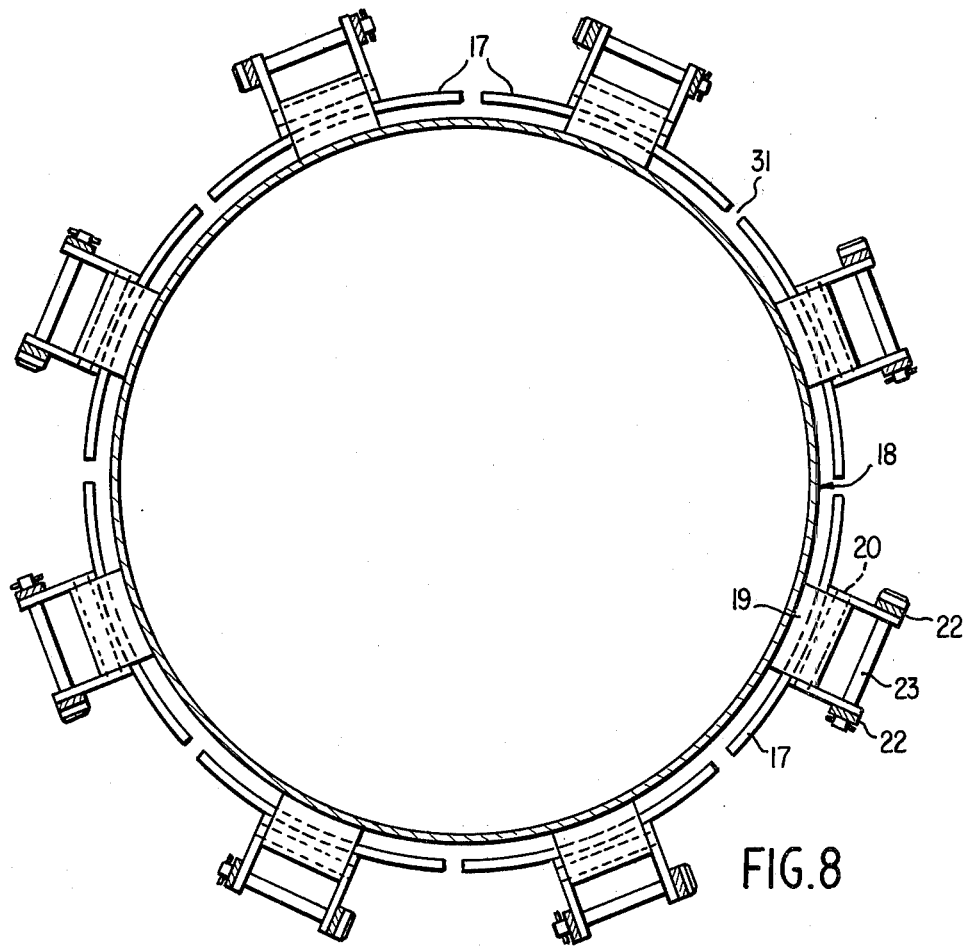

The hollow cylindrical body 18 in the embodiment of FIGS. 1 to 3 will now be described in further detail with reference to FIGS. 7 and 8.

The hollow cylindrical body 18 is closed at the top and open at the lower end as is shown, with its inner diameter being slightly greater than the outer diameter of the bladder 6. As has been made apparent in FIG. 6, the paddle 17 consists of a plurality of arcuate sections circumferentially spaced so as to surround the periphery of the cylindrical body with uniform spacing therebetween. As shown in FIG. 7, the individual paddle sections are each pivoted, at the radially inner, upper portion thereof by means of a pin 20, to a bracket 19 secured to the outer periphery of the hollow cylindrical body 18 and are also coupled on the radially outer upper portion by means of a pin 23 to the lower end of a vertical link 22 such that it is rotatable about the pin 20 in the direction of the arrows. In the instant embodiment, a disc member 25 is provided on the outer periphery of the hollow cylindrical body 18 as a drive source for vertically operating the links 22. Also, cylinders 26 and heads 27 are provided along the disc member 25 for vertical movement via bearings, or the like. Each head 27 is coupled by means of a pin 24 to the upper end of each of the aforenoted links 22, and each cylinder 26 is provided with upper and lower fluid supply ports 28 and 29 for supplying air or a similar fluid. When air is supplied from the lower fluid supply ports 28, the cylinders 26 and heads 27 are lowered so as to move the links 24 downwardly, causing the contraction or closing of each paddle section 17 about each pin 20. Conversely, with air supplied from the upper fluid supply ports 29, the cylinders 26 and heads 27 are raised so as to move the links 24 upwardly, causing the opening of the paddle sectons 17 about the respective pins 20. With this closing or opening of the paddle sections 17, the upper bead of the tire 1 can be grasped at the time of opening or released at the time of closing.

Figure 9:
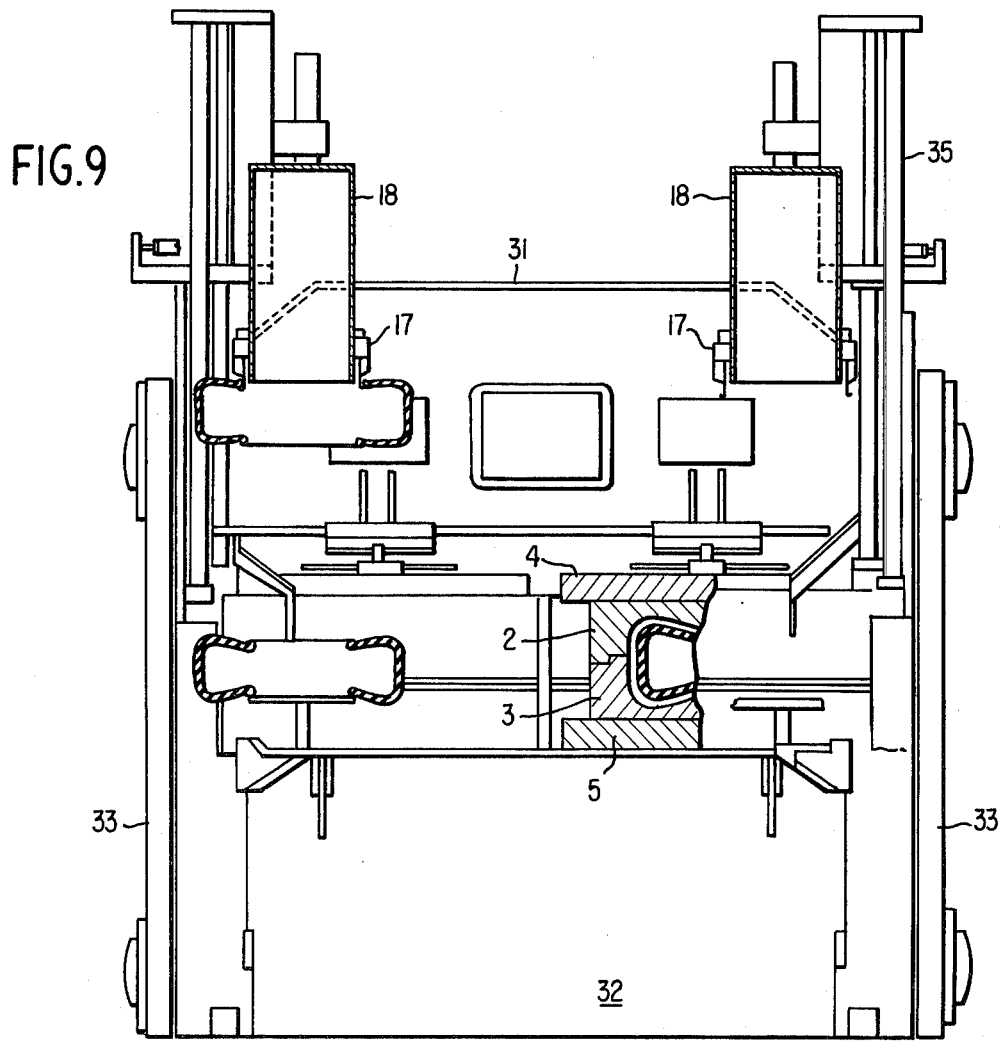
FIG. 9 is an elevation view, partly in section, showing an example of the vulcanizer incorporating the charging means according to the invention.

FIG. 9 shows an example of an application of the charging means constructed according to the present invention to a presently available vulcanizer. The illustrated vulcanizer of a twin mold press type is capable of simultaneously vulcanizing two tires. In the illustrated state, the upper and lower mold halves 2 and 3 of one of the molds are pressed together. The mold halves 2 and 3 are secured by bolts to respective upper and lower platens 4 and 5, the upper platen 4 being supported by means of a top link 31 and the lower platen 5 being supported on a base 32. In this vulcanizer, the mold clamping force is produced by means of a crank mechanism (not shown) through side links 33, and the top link is moved rearwardly by means of a tilt-back mechanism (not shown) so that it will not interfere with the loading of the tire by the charging means according to the present invention. The charging means according to the present invention is provided on the side plates of the frame of the vulcanizer, with its hollow cylindrical body 18 being capable of vertical movement by means of the cylinder 34 and also rotatable about a support shaft for removing a tire placed on a tire holder 35 in front of the vulcanizer with the paddle 17. For accomplishing aforenoted loading of the tire in the mold and the charging of the bladder 6, body 18 is first raised, then moved with the rotation of the support shaft to a position concentric with the mold that is, aligned with the center of the lower mold half, and then lowered. Of course, this is only an example in which the charging means may also be used as a removal means for subsequently removing the vulcanized tire, such removal being accomplished by raising the hollow cylindrical body 18 after the vulcanization which separates the hub 14 from the tire 1 by raising the hub 14, and holding removing the tire 1, and it also being possible to use a separate removal means, depending upon the type of vulcanizer employed.

As has been described in the foregoing, according to the present invention, the loading of the tire 1 to be vulcanized into the mold, and the charging of the bladder 6 into the tire with the lowering of the bladder, are effected as a result of the structural combination of the bladder 6 and the hollow cylindrical body 18, with the bladder 6 being supported at the bottom and in the center of the vulcanizer mold, so that it is possible to use the same bladder as used for a presently available new tire, thus to facilitating a the reduction in bladder costs In addition, since the insertion of the bladder into the tire 1 is effected by making use of the pressure differences between the interior of the hollow cylindrical body 18 and the interior of the bladder 6, and also as a result of the lowering of the bladder 6, the bladder can even be charged into tire having a narrow interbead distance, such as a recapped tire as a result of the lubricating effect of the low pressure air within the hollow cylindrical body and the guidance of the tire holding paddle so as to be reliably fitted on the inner surface of the tire.

Furthermore, the bladder 6 can be very smoothly removed as of result of elongation, and since the vulcanizing medium is introduced into the bladder 6 from the lower end thereof, there is no possibility of drainage remaining within the bladder after the vulcanization. This facilitates together with the smooth entering and removal operations, a substantial extension of the life of the bladder. Particularly, the charging means according to the present invention can be advantageously used for a vulcanizer for recapping tires and for promoting automation and the consequent saving of man-hours of the vulcanizing operation, the same also being simple in construction and free from mechanical failures.

Obviously, many modifications and variations of the present invention are possible in light of the above teachings. It is to be understood therefore that within the scope of the appended claims, the present invention may be practiced otherwise than as specifically described herein.

We claim:

1. A charging means for a vulcanizing press compressing a cylinder concentric with a vulcanizing mold for a tire, a piston rod vertically movable in said cylinder, and a gas-tight cylindrical bladder of a flexible material supported between the top of said piston rod and the top of said cylinder;

said charging means comprising a hollow cylindrical body disposed above and vertically movable with respect to the mold and having an inner diameter greater than the outer diameter of the bladder, said hollow cylindrical body being provided with a fluid inlet means for maintaining the pressure within the space defined between the inner surface of the hollow cylindrical body and the outer surface of the bladder to be higher than the pressure within the bladder, and said hollow cylindrical body is also provided on the lower end of the outer periphery thereof with a tire retaining means capable of closing and opening in the radial direction for holding the upper bead of a tire to be fitted in the mold for vulcanization.

2. The charging means according to claim 1, wherein said tire retaining means comprises a disc member provided on the outer periphery of said hollow cylindrical body, a drive means surrounding said disc member and including cylinder means capable of movement along the outer periphery of said hollow cylindrical body, a paddle means capable of holding a tire and having gap means for communication between the interior of the tire and atmosphere, and a link mechanism for transmitting the driving force from said drive means for converting the axial movement of said cylinder means into a movement of said paddle means in the radial direction.

3. The charging means according to claim 1, wherein said hollow cylindrical body is provided at the upper surface thereof with a fluid inlet port.

4. The charging means according to claim 3, wherein said hollow cylindrical body is also provided on the outer periphery thereof with additional fluid supply port means for jetting fluid toward the center of the hollow cylindrical body.

5. The charging means according to claim 3, wherein said hollow cylindrical body is also provided on the outer periphery thereof with additional fluid supply port means for jetting fluid in the tangential direction with respect to the periphery of the hollow cylindrical body.

6. The charging means according to claim 1, wherein said hollow cylindrical body is also provided on the outer periphery thereof with fluid supply port means for jetting fluid toward the center of the hollow cylindrical body.

7. The charging means according to claim 1, wherein said hollow cylindrical body is also provided on the outer periphery thereof with fluid supply port means for jetting fluid in the tangential direction with respect to the periphery of the hollow cylindrical body.

8. A charging means for a vulcanizing press comprising a cylinder concentric with a vulcanizing mold part for a tire, a piston rod vertically movable in said cylinder and having a free end disposed outside said cylinder, and a gas-tight cylindrical bladder of a flexible material supported between said free end of said piston rod and the end of said cylinder adjacent said vulcanizing mold part and facing said free end of said piston rod;

said charging means comprising a hollow cylindrical body disposed in surrounding relation to said piston rod and said bladder, being vertically movable with respect to said vulcanizing mold part and having an inner diameter greater than the outer diameter of said bladder when extended, the inner surface of said bladder, said cylinder at its one end and said free end of said piston rod together forming a first chamber, the spaced between the inner surface of said hollow cylindrical body and the outer surface of said bladder, at least on the end portion thereof connected to said free end of said piston, forming a second chamber, the inner surface of a tire disposed in said vulcanizing mold part and the outer surface of said bladder, at least on the portion thereof connected to said cylinder, forming a third chamber, and means for maintaining said second chamber at a higher pressure than said first chamber and for maintaining said first chamber at a higher pressure than said third chamber, and permitting leakage between said second chamber and said third chamber along the outer surface of said bladder.

whereby during operation, a flow of fluid from the second chamber through the space between the inner surface of said hollow cylindrical body and the outer surface of said bladder is present to provide a pneumatic lubricating effect to ensure smooth movement of said bladder within said hollow cylindrical body and smooth insertion of said bladder into the interior of said tire.

* * * * *